UNITED STATES PATENT OFFICE.

PHILIBERT FRANCOIS PERRIN, OF BRUNSWICK, GEORGIA.

LINIMENT.

SPECIFICATION forming part of Letters Patent No. 448,728, dated March 24, 1891.

Application filed July 31, 1890. Serial No. 360,556. (No specimens.)

*To all whom it may concern:*

Be it known that I, PHILIBERT FRANCOIS PERRIN, a citizen of France, and a resident of the city of Brunswick, in the county of Glynn and State of Georgia, have discovered certain new and useful Improvements in Medical Compounds known as Liniments; and I do hereby declare the following to be a full, clear, and exact description of the discovery, such as will enable others skilled in the art to which it appertains to make and use the same.

My discovery is a liniment for use externally in all diseases requiring the external application of an effective though perfectly-harmless remedy of this nature.

The compound consists of the following ingredients, the same being dissolved and mixed preferably in the manner herein specified: first, two ounces of alum dissolved in two ounces of water; second, two ounces of aqua-ammonia; third, two ounces of camphor-gum dissolved in two ounces of whisky or other alcoholic solvent; fourth, two ounces of salt (sodium chloride) dissolved in two ounces of water; fifth, one and one-half ounce of Cayenne pepper (capsicum) in one and one-half ounce water; sixth, one and one-half ounce ground ginger, (*Zinziber officinalis.*) These ingredients should be mixed, and water in quantity necessary to make the compound of the desired strength be added.

The fifth and sixth ingredients—viz., the solutions of pepper and of ginger—may be filtered, if desired, and it is preferable to do so, for otherwise the compound would contain the refuse of the solution.

If desired, the ordinary commercial extracts of capsicum and ginger may be used, and the quantities of any of the ingredients may be slightly varied, if desired, and I do not confine myself to the specific quantities set forth.

Having thus described my compound, what I claim as new, and desire to secure by Letters Patent of the United States, is—

In a medical compound, the combination of alum, water of ammonia, camphor, whisky, salt, Cayenne pepper, ginger, and water, in substantially the proportions specified.

In testimony whereof I hereunto affix my signature in presence of two witnesses.

PHILIBERT FRANCOIS PERRIN.

Witnesses:
W. BALDWIN MOORE,
J. L. BEACH.